US012688548B2

(12) United States Patent
Yang et al.

(10) Patent No.: US 12,688,548 B2
(45) Date of Patent: Jul. 21, 2026

(54) IMAGE PROCESSING METHOD AND IMAGE PROCESSING DEVICE

(71) Applicant: GENESYS LOGIC, INC., New Taipei City (TW)

(72) Inventors: Chuan-Yue Yang, New Taipei City (TW); Jin-Min Lin, New Taipei City (TW)

(73) Assignee: GENESYS LOGIC, INC., New Taipei City (TW)

( * ) Notice: Subject to any disclaimer, the term of this patent is extended or adjusted under 35 U.S.C. 154(b) by 258 days.

(21) Appl. No.: 18/605,839

(22) Filed: Mar. 15, 2024

(65) Prior Publication Data

US 2024/0354891 A1 Oct. 24, 2024

Related U.S. Application Data

(60) Provisional application No. 63/460,862, filed on Apr. 20, 2023.

(30) Foreign Application Priority Data

Feb. 5, 2024 (TW) ................................. 113104382

(51) Int. Cl.
*G06T 3/40* (2024.01)
*G06T 5/20* (2006.01)
(Continued)

(52) U.S. Cl.
CPC .................. *G06T 3/40* (2013.01); *G06T 5/20* (2013.01); *G06T 5/70* (2024.01); *G06V 10/751* (2022.01); *G06T 2207/20084* (2013.01)

(58) Field of Classification Search
CPC ...................................................... G06T 3/40
See application file for complete search history.

(56) References Cited

U.S. PATENT DOCUMENTS 8,655,109 B2 * 2/2014 Lin ...................... G06T 3/4053
382/299
2009/0110331 A1 4/2009 Takeshima et al.

FOREIGN PATENT DOCUMENTS

CN 106796716 11/2018
CN 107767343 8/2021
(Continued)

OTHER PUBLICATIONS

Brabandere et al, "Dynamic Filter Networks", ML, pp. 1-14, 2016 (Year: 2016).*

(Continued)

*Primary Examiner* — Edward Park
(74) *Attorney, Agent, or Firm* — JCIPRNET

(57) ABSTRACT

Embodiments of the disclosure provide an image processing method and an image processing device. The method includes the following. A first image is obtained, and the first image is down-sampled into a second image. A first resolution parameter combination of each second pixel in the second image is obtained. A target pixel among the first pixels is selected, and second pixels corresponding to the target pixel among the second pixels are accordingly obtained. A comparison result is determined between the target pixel and each second pixel corresponding to the target pixel, and a candidate pixel among the second pixels corresponding to the target pixel is accordingly selected. A second resolution parameter combination of the target pixel is selected based on the first resolution parameter combination of the candidate pixel. The target pixel is converted into an output pixel based on the second resolution parameter combination.

14 Claims, 10 Drawing Sheets

(51) Int. Cl.
  *G06T 5/70*    (2024.01)
  *G06V 10/75*   (2022.01)

(56)      References Cited

FOREIGN PATENT DOCUMENTS

TW   201633784  9/2016
TW   202203639  1/2022

OTHER PUBLICATIONS

Rukundo et al, "Nearest Neighbor Value Interpolation", IJACSA, pp. 1-6, 2012 (Year: 2012).*
Getreuer, Pascal, "Roussos{Maragos Tensor-Driven Diffusion for Image Interpolation", IPOL, pp. 178-186, 2011 (Year: 2011).*
"Office Action of Taiwan Counterpart Application", issued on Nov. 26, 2024, p. 1-p. 6.

* cited by examiner

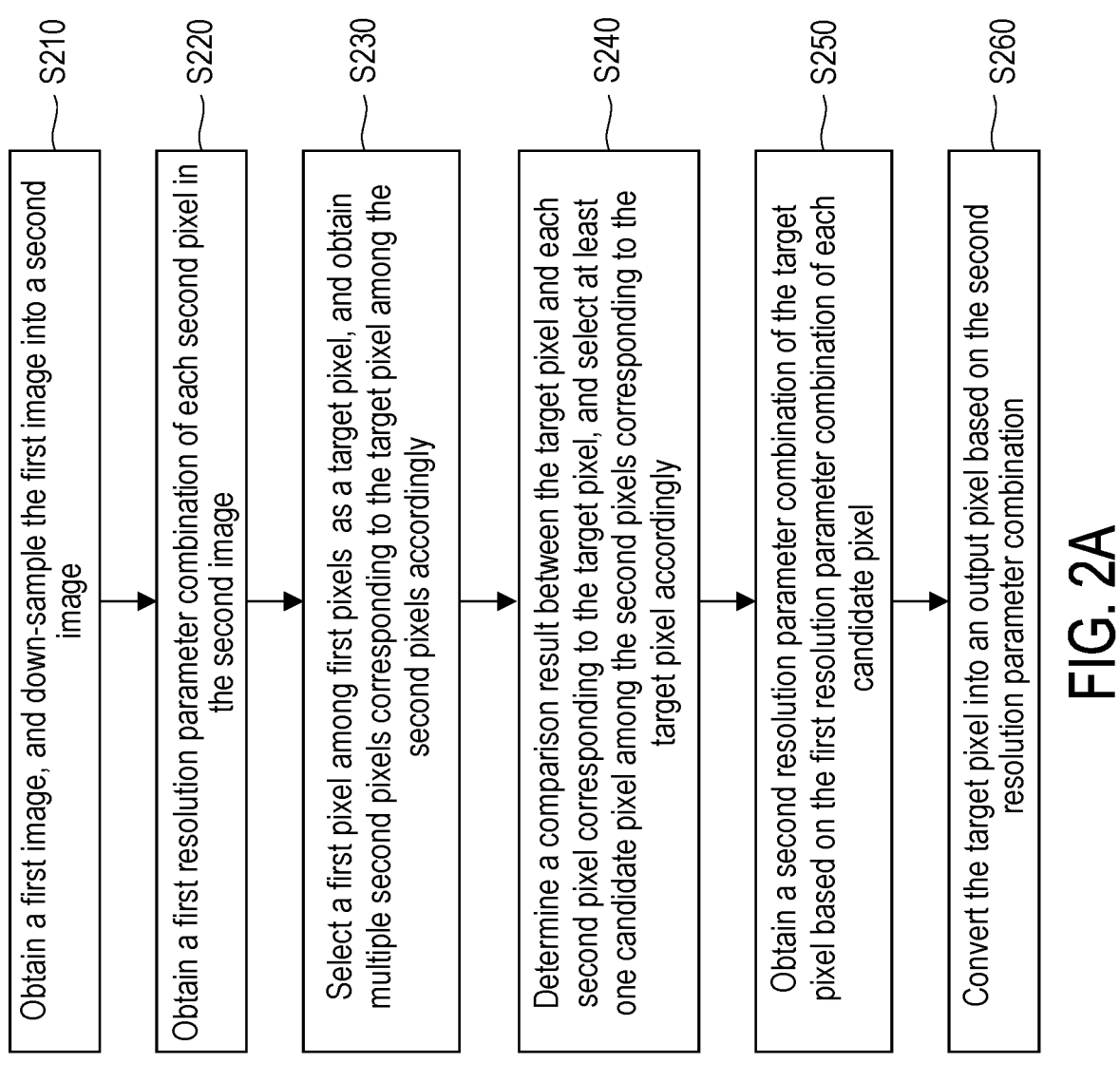

S210

Obtain a first image, and down-sample the first image into a second image

S220

Obtain a first resolution parameter combination of each second pixel in the second image

S230

Select a first pixel among first pixels as a target pixel, and obtain multiple second pixels corresponding to the target pixel among the second pixels accordingly

S240

Determine a comparison result between the target pixel and each second pixel corresponding to the target pixel, and select at least one candidate pixel among the second pixels corresponding to the target pixel accordingly

S250

Obtain a second resolution parameter combination of the target pixel based on the first resolution parameter combination of each candidate pixel

S260

Convert the target pixel into an output pixel based on the second resolution parameter combination

FIG. 2A

|   |   |   |
|---|---|---|
| V | S | V |
| S | C | S |
| V | S | V |

| V' | S' | V' |
|----|----|----|
| S' | C' | S' |
| V' | S' | V' |

IMAGE PROCESSING METHOD AND IMAGE PROCESSING DEVICE

CROSS-REFERENCE TO RELATED APPLICATION

This application claims the priority benefits of U.S. provisional application Ser. No. 63/460,862, filed on Apr. 20, 2023, and Taiwan application serial no. 113104382, filed on Feb. 5, 2024. The entirety of each of the above-mentioned patent applications is hereby incorporated by reference herein and made a part of this specification.

BACKGROUND

Technical Field

The disclosure relates to an image technology, and in particular to an image processing method and an image processing device.

Description of Related Art

Guided filter is a filtering technology used in the fields of image processing and computer vision. The guided filter is mainly used for image smoothing operation, which can not only remove noise in the image, but also retain important edge information.

Conventional filtering technology (such as Gaussian filtering) treats the entire image as a whole, while the guided filter uses an auxiliary image referred to as a "guided image" to help the filtering process. The guided image is usually some kind of conversion of the original image, such as a grayscale image, a gradient image, or other feature maps. The guided image has the same size as the original image, but reflects the structural information in the original image to some extent.

The guided filters are used in many computer vision tasks, including, for example, image noise reduction and image enhancement. Since the guided filter can smooth the image while retaining important features, the guided filter performs better than the conventional filtering method in many scenarios.

However, most of the existing guided filter technologies require the use of at least two neural networks, which results in high computational complexity and cost. In addition, some guided filter technologies require higher computation accuracy to be implemented, and the difficulty of implementation is increased.

SUMMARY

In view of the above, the disclosure provides an image processing method and an image processing device, which can be used to solve the above technical problems.

An embodiment of the disclosure provides an image processing method, suitable for an image processing device. The method includes the following. A first image is obtained, and the first image is down-sampled into a second image. The first image includes multiple first pixels, and the second image includes multiple second pixels. A first resolution parameter combination of each second pixel in the second image is obtained. A target pixel among the plurality of first pixels is selected, and a plurality of second pixels corresponding to the target pixel among the plurality of second pixels are accordingly obtained. A comparison result between the target pixel and each second pixel corresponding to the target pixel is determined, and at least one candidate pixel among the plurality of second pixels corresponding to the target pixel is accordingly selected. A second resolution parameter combination of the target pixel is obtained based on the first resolution parameter combination of each candidate pixel. The target pixel is converted into an output pixel based on the second resolution parameter combination.

An embodiment of the disclosure provides an image processing device, including a storage circuit and a processor. The storage circuit stores a program code. The processor is coupled to the storage circuit and accesses the program code to perform the following. A first image is obtained, and the first image is down-sampled into a second image. The first image includes multiple first pixels, and the second image includes multiple second pixels. A first resolution parameter combination of each second pixel in the second image is obtained. A target pixel among the plurality of first pixels is selected, and a plurality of second pixels corresponding to the target pixel among the plurality of second pixels are accordingly obtained. A comparison result between the target pixel and each second pixel corresponding to the target pixel is determined, and at least one candidate pixel among the plurality of second pixels corresponding to the target pixel is accordingly selected. A second resolution parameter combination of the target pixel is obtained based on the first resolution parameter combination of each candidate pixel. The target pixel is converted into an output pixel based on the second resolution parameter combination.

BRIEF DESCRIPTION OF THE DRAWINGS

FIG. 2A is a flow chart of an image processing method according to an embodiment of the disclosure.

FIG. 8A is a schematic diagram of a first filter used for pre-smoothing according to an embodiment of the disclosure.

FIG. 8B is a schematic diagram of a second filter used for post-smoothing according to an embodiment of the disclosure.

DESCRIPTION OF THE EMBODIMENTS

Figure 1:
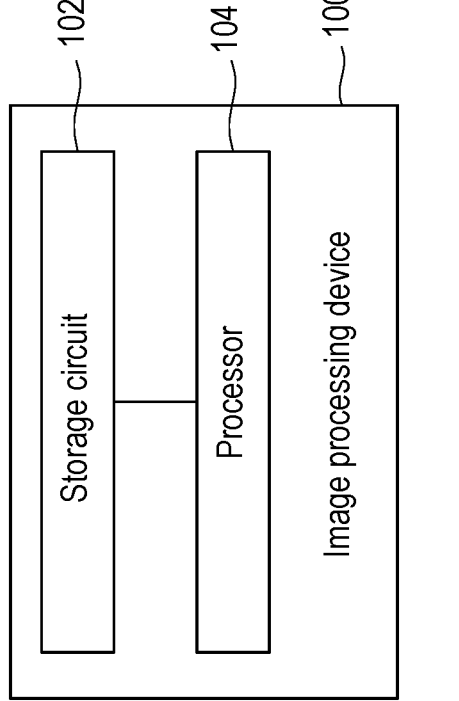
FIG. 1 is a schematic diagram of an image processing device according to an embodiment of the disclosure.

Please refer to FIG. 1, which is a schematic diagram of an image processing device according to an embodiment of the disclosure. In different embodiments, an image processing device 100 may be, for example, implemented as various smart devices and/or computer devices, but is not limited thereto.

In FIG. 1, the image processing device 100 includes a storage circuit 102 and a processor 104. The storage circuit 102 is, for example, any type of fixed or removable random access memory (RAM), read-only Memory (ROM), flash memory, hard disk, or other similar devices or combinations of the devices, which may be used to record multiple program codes or modules.

The processor 104 is coupled to the storage circuit 102 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kinds of integrated circuits, a state machine, an advanced RISC machine (ARM)-based processor, and similar devices.

In an embodiment of the disclosure, the processor 104 may access the modules and program codes recorded in the storage circuit 102 to implement an image processing method proposed by the disclosure, and the details are described in detail below.

Please refer to FIG. 2A, which is a flow chart of the image processing method according to an embodiment of the disclosure. The method according to the embodiment may be executed by the image processing device 100 in FIG. 1. The details of each step in FIG. 2A will be described below with the components shown in FIG. 1.

Figure 2B:
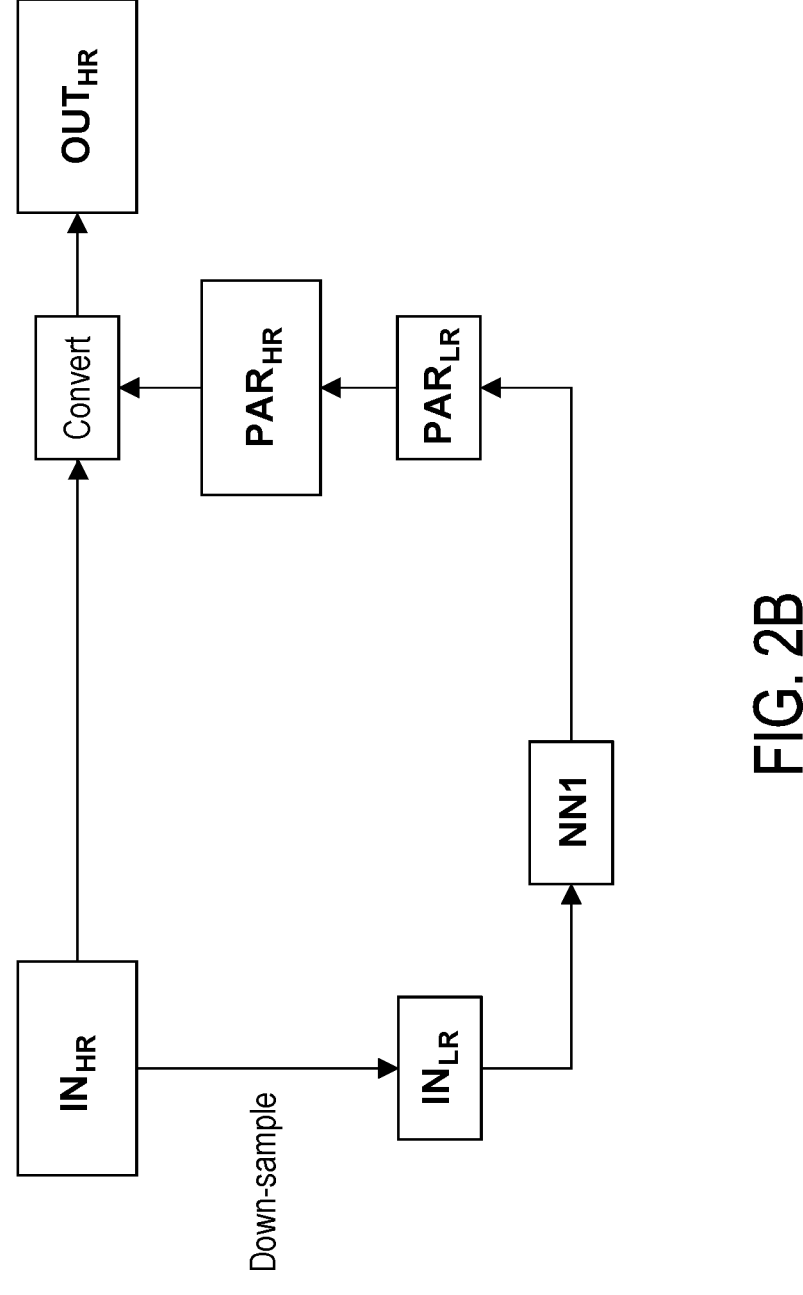
FIG. 2B is an application scenario diagram based on FIG. 2A.

Noted that the method shown in FIG. 2A may also be understood as a guided filtering method, and the related application scenarios may be summarized as the content shown in FIG. 2B. In order to make the concept of the disclosure more comprehensible, the following description will be illustrated in accompanying with FIG. 2B.

In step S210, the processor 104 obtains a first image $IN_{HR}$ and down-samples the first image $IN_{HR}$ into a second image $IN_{LR}$, in which the first image $IN_{HR}$ includes multiple pixels, and the second image $IN_{LR}$ includes multiple pixels. In an embodiment, the first image $IN_{HR}$ is, for example, any image to be used for guided filtering, but the disclosure is not limited thereto. The multiple pixels of the first image $IN_{HR}$ have their own pixel values, and the multiple pixels of the second image $IN_{LR}$ also have their own pixel values. For convenience of description, the multiple pixels of the first image $IN_{HR}$ described below are referred to as first pixels, and the multiple pixels of the second image $IN_{LR}$ are referred to as second pixels.

In an embodiment, the processor 104 may down-sample the first image $IN_{HR}$ into the second image $IN_{LR}$ based on a desired down-sample coefficient or scaling ratio (characterized by S).

Figure 3:
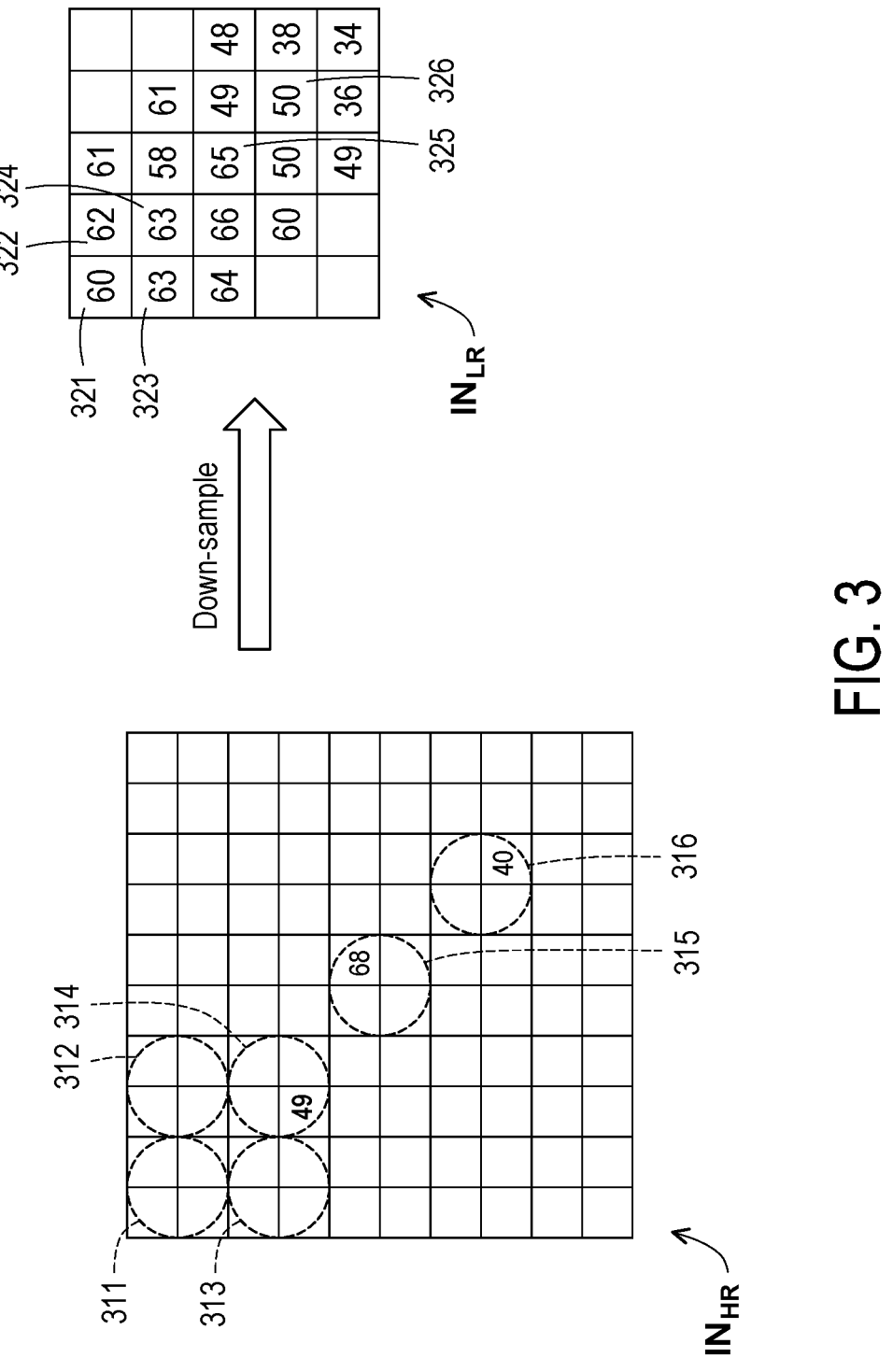
FIG. 3 is a schematic diagram of down-sampling according to an embodiment of the disclosure.

Please refer to FIG. 3, which is a schematic diagram of down-sampling according to an embodiment of the disclosure. In FIG. 3, assuming that the processor 104 is configured to down-sample the first image $IN_{HR}$ into the second image $IN_{LR}$ based on the down-sample coefficient or scaling ratio with a value of 2 (that is, S is 2), but this implementation manner is merely used as an example, and is not intended to limit possible implementations of the disclosure.

When S is 2, the processor 104 may convert every 4 first pixels in the first image $IN_{HR}$ into 1 second pixel in the second image $IN_{LR}$.

For example, the processor 104 may be configured to perform: converting the 4 first pixels located in a range 311 into a second pixel 321 in the second image $IN_{LR}$; converting the 4 first pixels located in a range 312 into a second pixel 322 in the second image $IN_{LR}$; converting the 4 first pixels located in a range 313 into a second pixel 323 in the second image $IN_{LR}$; converting the 4 first pixels located in a range 314 into a second pixel 324 in the second image $IN_{LR}$. Based on a similar principle, the processor 104 may also convert the 4 first pixels located in a range 315 into a second pixel 325 in the second image $IN_{LR}$, and convert the 4 first pixels located in a range 316 into a second pixel 326 in the second image $IN_{LR}$.

Other second pixels in the second image $IN_{LR}$ may also be derived based on the above description, so details will not be repeated herein.

It should be understood that each first pixel in the first image $IN_{HR}$ and each second pixel in the second image $IN_{LR}$ have a corresponding numerical value, but these numerical values are not shown for maintaining the simplicity of FIG. 3. The numerical value is, for example, the intensity of an image feature, and the image feature is, for example, the saturation, hue, or brightness of an image, but the disclosure is not limited thereto.

In an embodiment, since the second image $IN_{LR}$ is down-sampled from the first image $IN_{HR}$, the image resolution of the first image $IN_{HR}$ may be higher than the image resolution of the second image $IN_{LR}$. From another point of view, the second image $IN_{LR}$ may also be understood as a thumbnail of the first image $IN_{HR}$, but the disclosure is not limited thereto.

In step S220, the processor 104 obtains a first resolution parameter combination $PAR_{LR}$ of each second pixel in the second image $IN_{LR}$.

Please also refer to FIG. 2B. In FIG. 2B, the processor 104 may, for example, input the second image $IN_{LR}$ into a neural network NN1. The second image $IN_{LR}$ may be obtained through a computation of the neural network NN1 so that the first resolution parameter combination $PAR_{LR}$ of each second pixel may be obtained.

In different embodiments, designers may determine the network model and/or deep learning model used to implement the neural network NN1 according to various requirements, such as the convolutional neural network or the like, but the disclosure is not limited thereto.

In some embodiments, the implementation of the neural network NN1 may also refer to, for example, related art literatures such as "Google HDRnet", "Fast End-to-End Trainable Guided Filter", and "Fast Guided Filter", and the details will not be repeated herein.

In an embodiment, a first pixel located at coordinates (i, j) in the first image $IN_{HR}$ may be characterized by $$IN_{i,j}^{HR},$$

and a second pixel located at coordinates (m, n) in the second image $IN_{LR}$ may be characterized by $$IN_{m,n}^{LR},$$

but the disclosure is not limited thereto. In addition, in an embodiment, a first resolution parameter combination $PAR_{LR}$ of the second pixel $$IN_{m,n}^{LR},$$

in the second image $IN_{LR}$ may be characterized by, for example,

5

$$\left(A_{m,n}^{LR},\, b_{m,n}^{LR}\right)$$

but the disclosure is not limited thereto. In this embodiment, parameters A and b in the representation of $PAR_{LR}$ may be, for example, computed by the neural network NN1, but the disclosure is not limited thereto.

In step S230, the processor 104 selects a first pixel among the plurality of first pixels as a target pixel, and obtains a plurality of second pixels corresponding to the target pixel among the plurality of second pixels accordingly. For example, the target pixel of this embodiment in the first image $IN_{HR}$ is located at the coordinates (i, j), so the target pixel may be characterized by $$IN_{i,j}^{HR}.$$

In the disclosure, for example, the second pixels corresponding to the target pixel are defined as specific pixels and reference pixels. Regarding the definitions of the specific pixels and the reference pixels, details will be described below in the disclosure. In this embodiment, for example, a relationship between the target pixel in the first image $IN_{HR}$ and the corresponding second pixels in the second image $IN_{LR}$ is obtained based on the step S210, but the disclosure is not limited thereto.

In detail, in an embodiment of the disclosure, the processor 104, for example, regards the first pixels as target pixels one by one, and performs steps S230 to S260 accordingly. After step S260 is performed, an output pixel corresponding to a selected target pixel may be obtained. Regarding steps S240 to S260, details will be described below in the disclosure.

Based on above, each first pixel has a corresponding output pixel, and the processor 104 may correspondingly combine each first pixel selected with the corresponding output pixel, so as to generate an output image $OUT_{HR}$. In an embodiment, the output image $OUT_{HR}$ may be understood as a result image generated by the processor 104 via performing the guided filtering based on the first image $IN_{HR}$, but the disclosure is not limited thereto.

For better understanding, the concept of the disclosure will be described below by taking several first pixels among the first pixels as the examples of the target pixel, but this implementation manner is merely used as an example, and is not intended to limit possible implementations of the disclosure.

Figure 4:
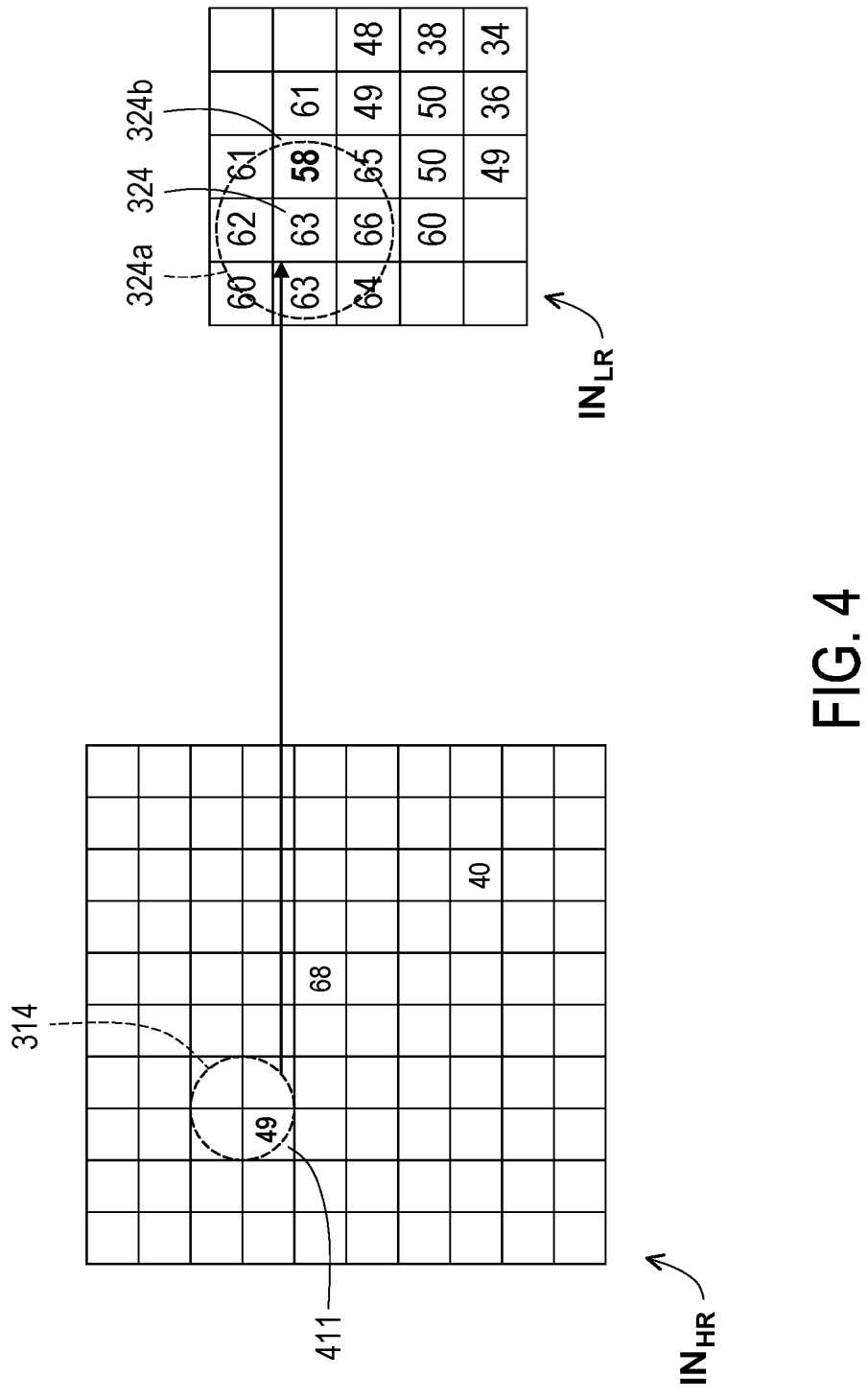
FIG. 4 is an application scenario diagram according to the first embodiment of the disclosure.

FIG. 4 is an application scenario diagram according to the first embodiment of the disclosure. Please refer to FIG. 4. In this embodiment, the first image $IN_{HR}$ is, for example, an image with a size of 10×10, in which it is assumed that a first pixel 411 with a numerical value of 49 is regarded as the currently selected target pixel, and the numerical value is, for example, the intensity value of the feature of the pixel as mentioned above. It may be seen from the foregoing description that when the coordinates of the target pixel in the first image $IN_{HR}$ are (i, j), the target pixel may be, for example, characterized by $$IN_{i,j}^{HR}.$$

6

Coordinates of the first pixel 411 in the first image $IN_{HR}$ are (3, 2), so the first pixel 411 selected as the target pixel may be characterized by $$IN_{3,2}^{HR}.$$

In this case, the processor 104 may obtain multiple second pixels corresponding to the first pixel 411 (that is, the target pixel) among the multiple second pixels.

In an embodiment, the processor 104 may select a second pixel corresponding to the target pixel among multiple second pixels in a down-sampled second image $IN_{LR}$, and the second pixel is defined as the specific pixel in this disclosure. The processor 104 may also obtain multiple second pixels surrounding the specific pixel, and assign the second pixels surrounding the specific pixel as the reference pixels corresponding to the target pixel. The second image $IN_{LR}$ after down-sampling is, for example, an image with a size of 5×5.

Please refer to FIG. 4 again. In this embodiment, since the first pixel 411 (that is, the target pixel) in the first image $IN_{HR}$ may be formed as the second pixel 324 with a numerical value of 63 in the second image $IN_{LR}$ through down-sampling as shown in FIG. 3, the processor 104 may select the second pixel 324 in the second image $IN_{LR}$ as the specific pixel in the embodiment shown in FIG. 4. Coordinates of the second pixel 324 (the specific pixel) in the second image $IN_{LR}$ are, for example, (1, 1), so the second pixel 324 (the specific pixel) may be, for example, characterized by $$IN_{1,1}^{LR}.$$

In this embodiment, for example, corresponding relationships between the target pixel, the specific pixel, and multiple reference pixels are obtained according to the above description, and then position information of the specific pixel is obtained. Regarding the manner to obtain the position of the specific pixel, the disclosure does not impose any limitation here.

Following the above, in step S230, the processor 104 may obtain multiple second pixels surrounding the specific pixel (e.g., the second pixel 324) in the second image $IN_{LR}$ (e.g., other second pixels in a range 324a except for the second pixel 324). The processor 104 also assigns the second pixels surrounding the specific pixel (e.g., the second pixel 324) as reference pixels corresponding to the first pixel 411 (that is, the target pixel), but the disclosure is not limited thereto. In a preferred embodiment, coordinates of the specific pixel and the plurality of reference pixels may be obtained according to $$\min_{m\in\{\lfloor\frac{i}{s}\rfloor,\lfloor\frac{i}{s}\rfloor+1\},n\in\{\lfloor\frac{i}{s}\rfloor,\lfloor\frac{i}{s}\rfloor\pm1\}} IN_{m,n}^{LR} \geq IN_{i,j}^{HR}.$$

In the formula, (m, n) are, for example, the coordinates of the specific pixel and the multiple reference pixels, (i, j) are, for example, the coordinates of the first pixel 411 (the target pixel) in the first image $IN_{HR}$, and S is, for example, the scaling ratio. The scaling ratio is, for example, the image scaling ratio between the first image and the second image, but the disclosure is not limited thereto. Furthermore, based on the coordinates of the first pixel 411 in the first image $IN_{HR}$ being (3, 2), the result of $$\min_{m \in \left\{ \left\lfloor \frac{3}{2} \right\rfloor, \left\lfloor \frac{3}{2} \right\rfloor \pm 1 \right\}, n \in \left\{ \left\lfloor \frac{2}{2} \right\rfloor, \left\lfloor \frac{2}{2} \right\rfloor \pm 1 \right\}} IN_{m,n}^{LR} = \min_{m \in \{0,1,2\}, n \in \{0,1,2\}} IN_{m,n}^{LR}$$

may be obtained. In other words, the coordinates (m, n) of the specific pixel and the plurality of reference pixels are, for example, located at coordinates (0,0), (0,1), (0,2), (1, 0), (1, 1), (1, 2), (2,0), (2,1), and (2, 2). In this way, this embodiment may obtain the coordinates of the specific pixel and the multiple reference pixels in the second image $IN_{LR}$. The specific pixel and the plurality of reference pixels (the second pixels) may be, for example characterized by $$IN_{m,n}^{LR}.$$

Afterward, in step S240, the processor 104 determines a comparison result between the target pixel and each second pixel corresponding to the target pixel, and selects at least one candidate pixel among the second pixels corresponding to the target pixel accordingly. In detail, in this embodiment, the processor 104 determines the comparison result between the numerical value of the target pixel in the first image $IN_{HR}$ and the numerical values of the specific pixel and the surrounding reference pixels in the second image $IN_{LR}$. Furthermore, the candidate pixel may be selected by comparing the specific pixel and the surrounding reference pixels in the second image $IN_{LR}$ with the target pixel in the first image $IN_{HR}$. Regarding the definition of the candidate pixel, details will be described below in the disclosure.

For example, in the embodiment of FIG. 4, the processor 104 determines that the numerical value of the specific pixel and the numerical values of the multiple reference pixels are all greater than the numerical value of the target pixel. In this embodiment, the processor 104 may select a smallest numerical value among the numerical value of the specific pixel and the numerical values of the multiple reference pixels, and use a second pixel corresponding to the smallest numerical value as a candidate pixel of the first pixel 411 (the target pixel). Coordinates of the candidate pixel in the second image $IN_{LR}$ are, for example, (x, y), which may be, for example, characterized by $$IN_{x,y}^{LR}.$$

Furthermore, in the range 324a, since the numerical value of the specific pixel (e.g., the second pixel 324) and the numerical value of each surrounding reference pixel are all greater than the numerical value (that is, 49) of the first pixel 411 (that is, the target pixel), the processor 104 may select a second pixel with the smallest numerical value among the specific pixel (e.g., the second pixel 324) and the surrounding reference pixels as the candidate pixel in the embodiment of FIG. 4. Furthermore, coordinate information and other related information of the candidate pixel (e.g., a second pixel 324b) may be obtained. Certainly, in other appropriate implementations, the processor 104 may also merely determine the size of the numerical value of the multiple reference pixels and the numerical value of the target pixel, and exclude comparing the numerical value of the specific pixel and the numerical value of the target pixel, and the disclosure does not impose any limitations here.

In FIG. 4, the second pixel with the smallest numerical value among the second pixel 324 (the specific pixel) and the surrounding second pixels (the reference pixels) is the second pixel 324b (with a numerical value of 58) located to the right of the specific pixel (the second pixel 324), and the processor 104 may select the second pixel 324b with the numerical value of 58 as the candidate pixel in the embodiment of FIG. 4. Based on that coordinates of the candidate pixel (e.g., the second pixel 324b) in the second image $IN_{LR}$ are (1, 2), the candidate pixel (the second pixel 324b) may be characterized by $$IN_{1,2}^{LR},$$

and the corresponding first resolution parameter combination $PAR_{LR}$ is, for example, $$\left( A_{1,2}^{LR}, b_{1,2}^{LR} \right).$$

Next, in step S250, the processor 104 obtains a second resolution parameter combination $PAR_{HR}$ of the target pixel (that is, the first pixel 411) based on the first resolution parameter combination $PAR_{LR}$ of each candidate pixel (that is, the second pixel 324b).

In the embodiment of the disclosure, the coordinates of the target pixel in the first image $IN_{HR}$ are, for example, (i, j), then the target pixel may be characterized by $$IN_{i,j}^{HR},$$

and the second resolution parameter combination $PAR_{HR}$ of the target pixel may be characterized by $$\left( A_{i,j}^{HR}, b_{i,j}^{HR} \right),$$

but the disclosure is not limited thereto.

Based on the above, in the implementation of determining that the candidate pixel is the one with the smallest numerical value among the numerical values corresponding to the specific pixel and the plurality of reference pixels, the processor 104 may assign the first resolution parameter combination $PAR_{LR}$ of the candidate pixel (that is, the second pixel 324b) as the second resolution parameter combination $PAR_{HR}$ of the target pixel.

Next, in step S260, the processor 104 converts the target pixel into an output pixel based on the second resolution parameter combination $PAR_{HR}$.

In an embodiment of the disclosure, the output pixel may be characterized by $$\text{``OUT}_{i,j}^{HR} = A_{i,j}^{HR} \cdot IN_{i,j}^{HR} + b_{i,j}^{HR}\text{''}.$$

In this embodiment, based on the implementation manner that the first resolution parameter combination $PAR_{LR}$ is assigned as the second resolution parameter combination $PAR_{HR}$ of the target pixel, accordingly, $$``A_{x,y}^{LR} = A_{i,j}^{HR}" \text{ and } "b_{x,y}^{LR} = b_{i,j}^{HR}".$$

In other words, the output pixel of this embodiment may be characterized by $$``OUT_{i,j}^{HR} = A_{x,y}^{LR} \cdot IN_{i,j}^{HR} + b_{x,y}^{LR}",$$

in which in this embodiment, $$``A_{x,y}^{LR} = A_{1,2}^{LR}" \text{ and } "b_{x,y}^{LR} = b_{1,2}^{LR}".$$

In the embodiment of FIG. 4, when the target pixel (e.g., the first pixel 411) in the first image $IN_{HR}$ is characterized by $$IN_{3,2}^{LR},$$

and the candidate pixel (e.g., the second pixel 324b) in the second image $IN_{LR}$ is characterized by $$IN_{1,2}^{LR},$$

a corresponding output pixel may be characterized by $$``OUT_{3,2}^{HR} = A_{x,y}^{LR} \cdot IN_{3,2}^{HR} + b_{x,y}^{LR} = A_{1,2}^{LR} \cdot IN_{3,2}^{HR} + b_{1,2}^{LR}",$$

but the disclosure is not limited thereto. Furthermore, the processor 104 correspondingly combine each first pixel selected with the corresponding output pixel, so as to generate the output image $OUT_{HR}$ with a size of, for example, 10×10.

Figure 5:
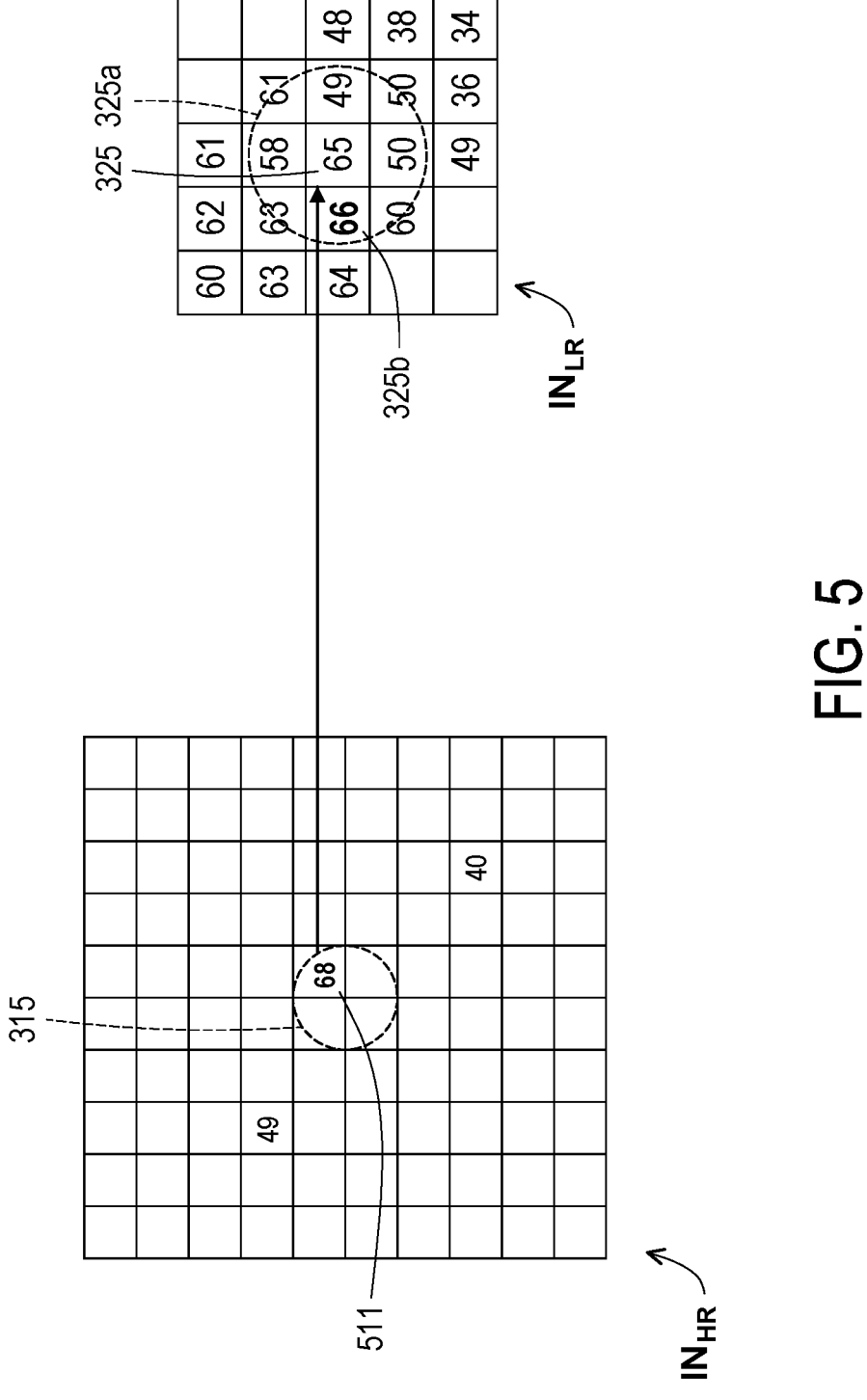
FIG. 5 is an application scenario diagram according to the second embodiment of the disclosure.

FIG. 5 is an application scenario diagram according to the second embodiment of the disclosure. Please refer to FIG. 5. In this embodiment, the first image $IN_{HR}$ is, for example, an image with a size of 10×10, in which it is assumed that a first pixel 511 with a numerical value of 68 is regarded as a currently selected target pixel, and the numerical value is, for example, the intensity value of the feature of the pixel as mentioned above. It may be seen from the foregoing description that when the coordinates of the target pixel in the first image $IN_{HR}$ are (i, j), the target pixel may be, for example, characterized by $$IN_{i,j}^{HR}.$$

Coordinates of the first pixel 511 in the first image $IN_{HR}$ are (4, 5), so the first pixel 511 selected as the target pixel may be characterized by $$IN_{4,5}^{HR}.$$

In this case, the processor 104 may obtain multiple second pixels corresponding to the first pixel 511 (that is, the target pixel) among the multiple second pixels.

Similar to the above embodiment, in this embodiment, the processor 104 may also select a second pixel corresponding to the target pixel among multiple second pixels in the down-sampled second image $IN_{LR}$, and the second pixel is defined as the specific pixel corresponding to the first pixel 511 (the target pixel). The processor 104 may also obtain multiple second pixels surrounding the specific pixel, and assign the second pixels surrounding the specific pixel as the reference pixels corresponding to the target pixel. The second image $IN_{LR}$ after down-sampling is, for example, an image with a size of 5×5.

Please refer to FIG. 5 again. Since the first pixel 511 (that is, the target pixel) in the first image $IN_{HR}$ may be formed as the second pixel 325 with a numerical value of 65 in the second image $IN_{LR}$ through down-sampling as shown in FIG. 3, the processor 104 may select the second pixel 325 in the second image $IN_{LR}$ as the specific pixel in the embodiment shown in FIG. 5. Coordinates of the second pixel 325 (the specific pixel) in the second image $IN_{LR}$ are, for example, (2, 1), so the second pixel 325 (the specific pixel) may be, for example, characterized by $$IN_{2,1}^{LR}.$$

In this embodiment, for example, corresponding relationships between the target pixel, the specific pixel, and multiple reference pixels are obtained according to the above description, and then position information of the specific pixel is obtained. Regarding the manner to obtain the position of the specific pixel, the disclosure does not impose any limitation here.

Following the above, in step S230, the processor 104 may obtain multiple second pixels surrounding the specific pixel (e.g., the second pixel 325) in the second image $IN_{LR}$ (e.g., other second pixels in a range 325a except for the second pixel 325). The processor 104 also assigns the second pixels surrounding the specific pixel (e.g., the second pixel 325) as reference pixels corresponding to the first pixel 511 (that is, the target pixel), but the disclosure is not limited thereto. In a preferred embodiment, coordinates of the specific pixel and the plurality of reference pixels may be obtained according to $$\max_{m \in \left\{ \lfloor \frac{i}{s} \rfloor, \lfloor \frac{i}{s} \rfloor \pm 1 \right\}, n \in \left\{ \lfloor \frac{i}{s} \rfloor, \lfloor \frac{i}{s} \rfloor \pm 1 \right\}} IN_{m,n}^{LR} \le IN_{i,j}^{HR}.$$

In the formula, (m, n) are, for example, the coordinates of the specific pixel and the multiple reference pixels, (i, j) are, for example, the coordinates of the first pixel 511 (the target pixel) in the first image $IN_{HR}$, and S is, for example, the scaling ratio. The scaling ratio is, for example, the image scaling ratio between the first image and the second image, but the disclosure is not limited thereto. Furthermore, based on the coordinates of the first pixel 511 in the first image $IN_{HR}$ being (4, 5), the result of $$\max_{m \in \left\{ \lfloor \frac{4}{2} \rfloor, \lfloor \frac{4}{2} \rfloor \pm 1 \right\}, n \in \left\{ \lfloor \frac{5}{2} \rfloor, \lfloor \frac{5}{2} \rfloor \pm 1 \right\}} IN_{m,n}^{LR} = \max_{m \in \{1,2,3\}, n \in \{1,2,3\}} IN_{m,n}^{LR}$$

may be obtained. In other words, the coordinates (m, n) of the specific pixel and the plurality of reference pixels are, for example, located at the coordinates (1, 1), (1, 2), (1, 3), (2,1), (2, 2), (2,3), (3,1), (3,2), and (3,3). In this way, this embodiment may obtain the coordinates of the specific pixel and the multiple reference pixels in the second image $IN_{LR}$. The specific pixel and the plurality of reference pixels (the second pixels) may be, for example characterized by $$IN_{m,n}^{LR}.$$

Afterward, in step S240, the processor 104 determines the comparison result between the target pixel and each second pixel corresponding to the target pixel, and selects at least one candidate pixel among the second pixels corresponding to the target pixel accordingly. In detail, in this embodiment, the processor 104 determines the comparison result between the numerical value of the target pixel in the first image $IN_{HR}$ and the numerical values of the specific pixel and the surrounding reference pixels in the second image $IN_{LR}$. Furthermore, the candidate pixel may be selected by comparing the specific pixel and the surrounding reference pixels in the second image $IN_{LR}$ with the target pixel in the first image $IN_{HR}$.

For example, in the embodiment of FIG. 5, the processor 104 determines that the numerical value of the specific pixel and the numerical values of the multiple reference pixels in the second image $IN_{LR}$ are all smaller than the numerical value of the first pixel 511 (the target pixel) in the first image $IN_{HR}$. In this embodiment, the processor 104 may select a largest numerical value among the numerical value of the specific pixel and the numerical values of the multiple reference pixels, and use a second pixel corresponding to the largest numerical value as a candidate pixel of the first pixel 511 (the target pixel). Coordinates of the candidate pixel in the second image $IN_{LR}$ are, for example, (x, y), which may be, for example, characterized by $$IN_{x,y}^{LR}.$$

Furthermore, in the range 325a, since the numerical value of the specific pixel (e.g., the second pixel 325) and the numerical value of each surrounding reference pixel are all smaller than the numerical value (that is, 68) of the first pixel 511 (that is, the target pixel), the processor 104 may select a second pixel with the largest numerical value among the specific pixel (e.g., the second pixel 325) and the surrounding reference pixels as the candidate pixel in the embodiment of FIG. 5. Furthermore, coordinate information and other related information of the candidate pixel (e.g., a second pixel 325b) may be obtained. Certainly, in other appropriate implementations, the processor 104 may also merely determine the size of the numerical value of the multiple reference pixels and the numerical value of the target pixel, and exclude comparing the numerical value of the specific pixel and the numerical value of the target pixel, and the disclosure does not impose any limitations here.

In FIG. 5, the second pixel with the largest numerical value among the second pixel 325 (the specific pixel) and the surrounding second pixels (the reference pixels) is the second pixel 325b (with a numerical value of 66) located to the left of the second pixel 325, and the processor 104 may select the second pixel 325b with the numerical value of 66 as the candidate pixel in the embodiment of FIG. 5. Based on that the candidate pixel may be, for example, characterized by $$IN_{x,y}^{LR},$$

and that the coordinates of the candidate pixel (e.g., the second pixel 325b) of this embodiment in the second image $IN_{LR}$ are (2, 1), the candidate pixel (e.g., the second pixel 325b) of this embodiment may be characterized by $$IN_{2,1}^{LR},$$

and the corresponding first resolution parameter combination $PAR_{LR}$ is, for example, $$\left(A_{2,1}^{LR},\, b_{2,1}^{LR}\right).$$

Next, in step S250, the processor 104 obtains a second resolution parameter combination $PAR_{HR}$ of the target pixel (that is, the first pixel 511) based on the first resolution parameter combination $PAR_{LR}$ of each candidate pixel (that is, the second pixel 325b).

In the embodiment of the disclosure, the coordinates of the target pixel in the first image $IN_{HR}$ are, for example, (i, j), then the target pixel may be characterized by $$IN_{i,j}^{HR},$$

and the second resolution parameter combination $PAR_{HR}$ of the target pixel may be characterized by $$\left(A_{x,y}^{HR},\, b_{x,y}^{HR}\right),$$

but the disclosure is not limited thereto.

Based on the above, in the implementation of determining that the candidate pixel is the one with the largest numerical value among the numerical values corresponding to the specific pixel and the plurality of reference pixels, the processor 104 may assign the first resolution parameter combination $PAR_{LR}$ of the candidate pixel (that is, the second pixel 325b) as the second resolution parameter combination $PAR_{HR}$ of the target pixel.

Next, in step S260, the processor 104 converts the target pixel into an output pixel based on the second resolution parameter combination $PAR_{HR}$.

Similarly, in the embodiment of the disclosure, the output pixel may be characterized by $$\text{``}OUT_{i,j}^{HR} = A_{i,j}^{HR} \cdot IN_{i,j}^{HR} + b_{i,j}^{HR}\text{''}.$$

In this embodiment, based on the implementation manner that the first resolution parameter combination $PAR_{LR}$ is assigned as the second resolution parameter combination $PAR_{HR}$ of the target pixel, accordingly, $$``A_{x,y}^{LR} = A_{i,j}^{HR}, \text{ and } b_{x,y}^{LR} = b_{i,j}^{HR}".$$

In other words, the output pixel of this embodiment may be characterized by $$\text{OUT}_{i,j}^{HR} = A_{x,y}^{LR} \cdot \text{IN}_{i,j}^{HR} + b_{x,y}^{LR},$$

in which in this embodiment, $$``A_{x,y}^{LR} = A_{2,1}^{LR}" \text{ and } ``b_{x,y}^{LR} = b_{2,1}^{LR}".$$

In the embodiment of FIG. 5, when the target pixel (e.g., the first pixel 511) in the first image $\text{IN}_{HR}$ is characterized by $$\text{IN}_{4,5}^{HR},$$

and the candidate pixel (e.g., the second pixel 325b) in the second image $\text{IN}_{LR}$ is characterized by $$\text{IN}_{2,1}^{LR},$$

a corresponding output pixel may be characterized by $$``\text{OUT}_{4,5}^{HR} = A_{x,y}^{LR} \cdot \text{IN}_{4,5}^{HR} + b_{x,y}^{LR} = A_{2,1}^{LR} \cdot \text{IN}_{4,5}^{HR} + b_{2,1}^{LR}",$$

but the disclosure is not limited thereto. Furthermore, the processor 104 correspondingly combine each first pixel selected with the corresponding output pixel, so as to generate the output image $\text{OUT}_{HR}$ with a size of, for example, 10×10.

Figure 6:
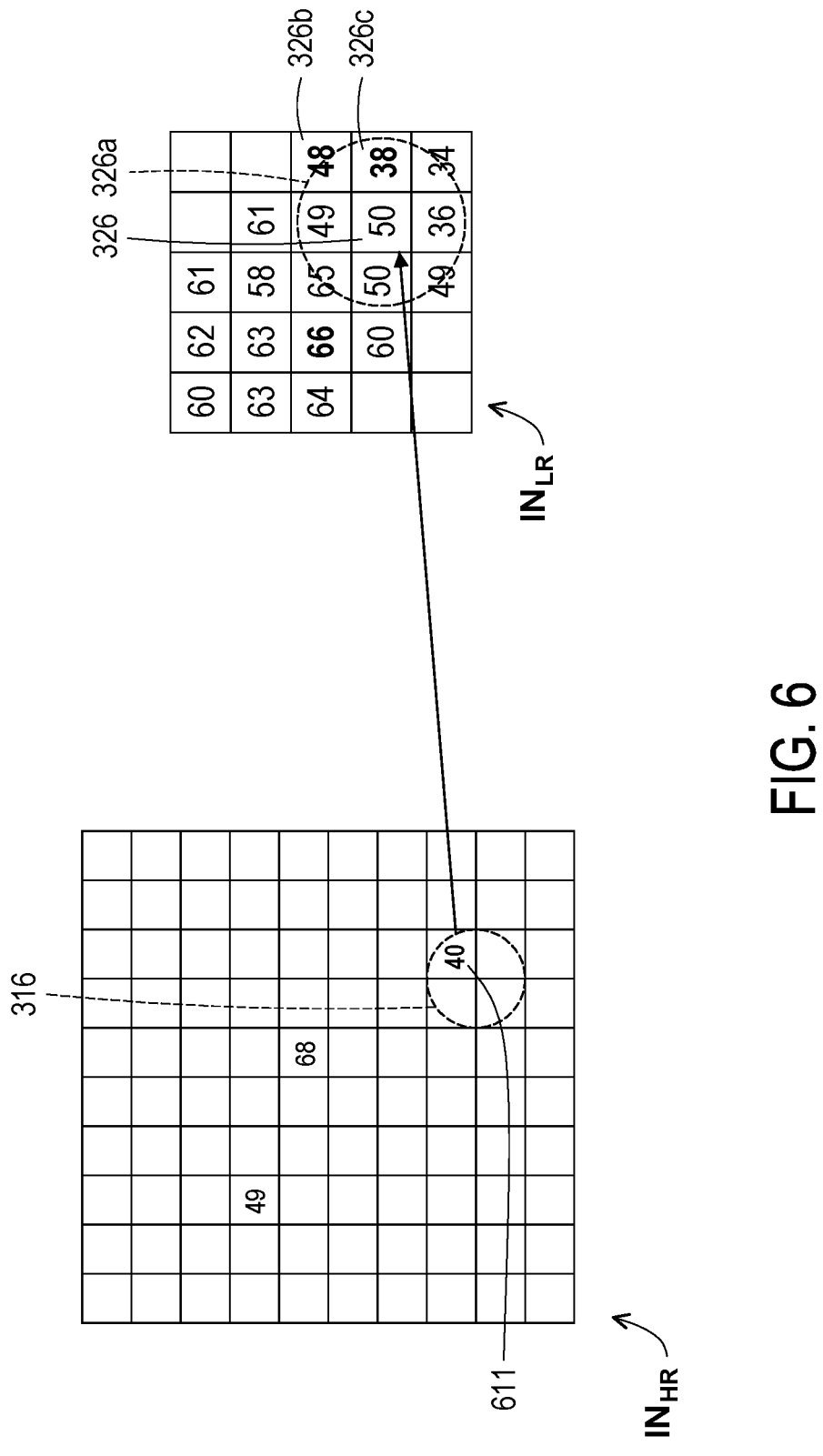
FIG. 6 is an application scenario diagram according to the third embodiment of the disclosure.

FIG. 6 is an application scenario diagram according to the third embodiment of the disclosure. Please refer to FIG. 6. In this embodiment, the first image $\text{IN}_{HR}$ is, for example, an image with a size of 10×10, in which it is assumed that a first pixel 611 with a numerical value of 40 is regarded as a currently selected target pixel, and the numerical value is, for example, the intensity value of the feature of the pixel as mentioned above. It may be seen from the foregoing description that when the coordinates of the target pixel in the first image $\text{IN}_{HR}$ are (i, j), the target pixel may be, for example, characterized by $$\text{IN}_{i,j}^{HR}.$$

Coordinates of the first pixel 611 (the target pixel) in the first image $\text{IN}_{HR}$ are (8, 8), so the first pixel 611 selected as the target pixel may be characterized by $$\text{IN}_{8,8}^{HR}.$$

In this case, the processor 104 may obtain multiple second pixels corresponding to the first pixel 611 (that is, the target pixel) among the multiple second pixels.

Similar to the above embodiment, in this embodiment, the processor 104 may also select a second pixel corresponding to the target pixel among multiple second pixels in the down-sampled second image $\text{IN}_{LR}$, and the second pixel is defined as the specific pixel corresponding to the first pixel 611 (the target pixel). Afterward, the processor 104 may obtain multiple second pixels surrounding the specific pixel, and assign the second pixels surrounding the specific pixel as the reference pixels corresponding to the target pixel. The second image $\text{IN}_{LR}$ after down-sampling is, for example, an image with a size of 5×5.

Please refer to FIG. 6 again. Since the first pixel 611 (that is, the target pixel) in the first image $\text{IN}_{HR}$ may be formed as the second pixel 326 with a numerical value of 50 in the second image $\text{IN}_{LR}$ through down-sampling as shown in FIG. 3, the processor 104 may select the second pixel 326 as the specific pixel in the embodiment shown in FIG. 6. Coordinates of the second pixel 326 (the specific pixel) in the second image $\text{IN}_{LR}$ are, for example, (3, 3), so the second pixel 326 (the specific pixel) may be, for example, characterized by $$\text{IN}_{3,3}^{LR}.$$

In this embodiment, for example, corresponding relationships between the target pixel, the specific pixel, and multiple reference pixels are obtained according to the above description, and then position information of the specific pixel is obtained. Regarding the manner to obtain the position of the specific pixel, the disclosure does not impose any limitation here.

Following the above, in step S230, the processor 104 may obtain multiple second pixels surrounding the specific pixel (e.g., the second pixel 326) in the second image $\text{IN}_{LR}$ (e.g., other second pixels in a range 326a except for the second pixel 326). The processor 104 also assigns the second pixels surrounding the specific pixel (e.g., the second pixel 326) as reference pixels corresponding to the first pixel 611 (that is, the target pixel), but the disclosure is not limited thereto.

Afterward, in step S240, the processor 104 determines the comparison result between the target pixel and each second pixel corresponding to the target pixel, and selects at least one candidate pixel among the second pixels corresponding to the target pixel accordingly. In detail, in this embodiment, the processor 104 determines the comparison result between the numerical value of the target pixel in the first image $\text{IN}_{HR}$ and the numerical values of the specific pixel and the surrounding reference pixels in the second image $\text{IN}_{LR}$. That is, at least one candidate pixel is obtained by comparing the specific pixel and the reference pixels surrounding the specific pixel in the second image $\text{IN}_{LR}$ with the target pixel in the first image $\text{IN}_{HR}$.

For example, in the embodiment of FIG. 6, the processor 104 determines that the numerical value of the specific pixel and the numerical values of the multiple reference pixels in the second image $\text{IN}_{LR}$ are not all smaller than the numerical value of the first pixel 611 (the target pixel) in the first image $\text{IN}_{HR}$, the numerical value of the specific pixel and the numerical values of the reference pixels are not all greater than the numerical value of the first pixel 611 (the target pixel), either. Particularly, in this embodiment, the processor 104 selects two pixels among the specific pixel and the reference pixels in a preferred manner as candidate pixels. In other embodiments, the processor 104 may also select any two pixels among the second pixels surrounding the second pixel 326 as the candidate pixels to be considered, and the disclosure is not limited thereto.

Following the above, please continue to refer to FIG. 6. In the range 326*a*, the numerical values of the reference pixels surrounding the second pixel 326 (the specific pixel) is smaller than the numerical value (that is, 40) of the first pixel 611 (that is, the target pixel), and the numerical values of the second pixel 326 (the specific pixel) and the surrounding reference pixels are greater than the numerical value (that is, 40) of the first pixel 611 (that is, the target pixel). Therefore, in this embodiment, for example, the processor 104 selects a second pixel with a largest numerical value smaller than the numerical value (that is, 40) of the first pixel 611 among the second pixel 326 and the surrounding reference pixels as a candidate pixel in the scenario of FIG. 6. In addition, in this embodiment, for example, the processor 104 also selects a second pixel with a smallest numerical value greater than the numerical value (that is, 40) of the first pixel 611 among the second pixel 326 and the surrounding reference pixels as a candidate pixel in the scenario of FIG. 6. In other words, in this embodiment, processor 104 selects two candidate pixels among the second pixels corresponding to the target pixel.

Regarding the selection of candidate pixels mentioned above, details will be further described below in the disclosure.

In this embodiment, the processor 104, for example, divides the specific pixel and the plurality of reference pixels into a first group and a second group, in which the numerical values of the specific pixel and the reference pixels in the first group are all greater than the target pixel, and the numerical values of the reference pixels in the second group are all smaller than the target pixel. As shown in FIG. 6, the first group determined by the processor 104 according to the above principle may include, for example, the second pixel 326 and second pixels (whose numerical values are all greater than the numerical value of the target pixel) located on the upper right, upper, upper left, left, and lower left. In addition, the second group determined by the processor 104 according to the above principle may include, for example, second pixels (whose numerical values are all smaller than the numerical value of the target pixel) located to the right, lower right, and below the second pixel 326 (the specific pixel).

Afterward, the processor 104 may select a first candidate pixel among the reference pixels of the first group, and select a second candidate pixel among the reference pixels of the second group.

In this embodiment, the numerical value of the first candidate pixel selected by the processor 104 in the first group is, for example, a minimum numerical value, and the numerical value of the second candidate pixel selected in the second group is, for example, a maximum numerical value. In the scenario of FIG. 6, the first candidate pixel selected by the processor 104 is, for example, a second pixel 326*b* located on the upper right side of the specific pixel (e.g., the second pixel 326), the second candidate pixel selected by the processor 104 is, for example, a second pixel 326*c* located to the right of the specific pixel (the second pixel 326), but the disclosure is not limited thereto.

In other embodiments, the processor 104 may also select any reference pixel among the first group or select a reference pixel as the first candidate pixel according to an appropriate criterion. Correspondingly, the processor 104 may also select any reference pixel among the second group or select a reference pixel as the second candidate pixel according to an appropriate criterion.

In this embodiment, the first resolution parameter combination $\text{PAR}_{LR}$ of the first candidate pixel may be characterized by $$\left(A^{LR}_{x1,y1},\ b^{LR}_{x1,y1}\right),$$

in which (x1, y1) is, for example, coordinates of the first candidate pixel in the second image $\text{IN}_{LR}$. In addition, the first resolution parameter combination $\text{PAR}_{LR}$ of the second candidate pixel may be characterized by $$\left(A^{LR}_{x2,y2},\ b^{LR}_{x2,y2}\right),$$

in which (x2, y2) is, for example, coordinates of the second candidate pixel in the second image $\text{IN}_{LR}$, but the disclosure is not limited thereto. In this embodiment, the first candidate pixel is, for example, the second pixel 326*b*, and the second candidate pixel is, for example, the second pixel 326*c*.

Following the above, since the coordinates of the first candidate pixel (the second pixel 326*b*) in the second image $\text{IN}_{LR}$ are (2, 4), the first candidate pixel (the second pixel 326*b*) may also be characterized by $$\text{IN}^{LR}_{2,4},$$

and the corresponding first resolution parameter combination $\text{PAR}_{LR}$ is, for example, $$\left(A^{LR}_{2,4},\ b^{LR}_{2,4}\right)$$

(that is, $$\left(A^{LR}_{x1,y1},\ b^{LR}_{x1,y1}\right).$$

In addition, since the coordinates of the second candidate pixel (e.g., the second pixel 326*c*) in the second image $\text{IN}_{LR}$ are (3, 4), the second candidate pixel (e.g., the second pixel 326*c*) may be characterized by $$\text{IN}^{LR}_{3,4},$$

and the corresponding first resolution parameter combination $\text{PAR}_{LR}$ is, for example, $$\left(A^{LR}_{3,4},\ b^{LR}_{3,4}\right)$$

(that is, $$\left(A^{LR}_{x2,y2},\ b^{LR}_{x2,y2}\right).$$

Next, in step S250, the processor 104 obtains the second resolution parameter combination $\text{PAR}_{HR}$ of the target pixel (that is, the first pixel 611) based on the first resolution parameter combination $\text{PAR}_{LR}$ of each candidate pixel (that is, the second pixels 326*b*, 326*c*).

In an embodiment of the disclosure, assuming that the coordinates of the target pixel in the first image $\text{IN}_{HR}$ are (i, j), the target pixel may be characterized by $$IN_{i,j}^{HR},$$

and the second resolution parameter combination $\text{PAR}_{HR}$ of the target pixel may be characterized by $$A_{i,j}^{HR}, b_{i,j}^{HR},$$

but the disclosure is not limited thereto.

Based on the above, in the implementation of determining the first candidate pixel (e.g., the second pixel 326*b*) and the second candidate pixel (e.g., the second pixel 326*c*), the processor 104 may combine the first resolution parameter combination $\text{PAR}_{LR}$ of the first candidate pixel and the first resolution parameter combination $\text{PAR}_{LR}$ of the second candidate pixel into the second resolution parameter combination $\text{PAR}_{HR}$ of the target pixel (e.g., the first pixel 611).

In this embodiment, the first resolution parameter combination $\text{PAR}_{LR}$ after the aforementioned combination is characterized by $$\left(A_{x,y}^{LR}, b_{x,y}^{LR}\right). \ A_{x,y}^{LR}$$

may be characterized by $$\text{``}A_{x,y}^{LR} = w_1 \cdot A_{x1,y1}^{LR} + w_2 \cdot A_{x2,y2}^{LR}\text{''},$$

and $$b_{x,y}^{LR}$$

may be characterized by $$\text{``}b_{x,y}^{LR} = w_1 \cdot b_{x1,y1}^{LR} + w_2 \cdot b_{x2,y2}^{LR}\text{''}.$$

(x1, y1) is, for example, the coordinates of the first candidate pixel (the second pixel 326*b*) in the second image $\text{IN}_{LR}$, and (x2, y2) is, for example, the coordinates of the second candidate pixel (e.g., the second pixel 326*c*) in the second image $\text{IN}_{LR}$. In this embodiment, the coordinates (x1, y1) of the first candidate pixel are, for example, (2, 4), and the coordinates of the second candidate pixel are, for example, (3, 4).

In the embodiment of FIG. 6, $$A_{x,y}^{LR}$$

may be characterized by $$\text{``}A_{x,y}^{LR} = w_1 \cdot A_{2,4}^{LR} + w_2 \cdot A_{3,4}^{LR}\text{''}, \text{ and } b_{x,y}^{LR}$$

may be characterized by $$\text{``}b_{x,y}^{LR} = w_1 \cdot b_{2,4}^{LR} + w_2 \cdot b_{3,4}^{LR}\text{''}.$$

In a preferred embodiment, $$w_1 = \frac{d_2}{d_1 + d_2}, w_2 = \frac{d_1}{d_1 + d_2}\Big],$$

in which $d_1$ is an absolute difference between the first candidate pixel and the target pixel, and $d_2$ is an absolute difference between the second candidate pixel and the target pixel. In the implementation shown in FIG. 6, the coordinates of the target pixel (e.g., the first pixel 611) in the first image $\text{IN}_{HR}$ are, for example, (8, 8).

Based on the above, in FIG. 6, $d_1$ may be, for example, characterized by $$\text{``}d_1 = \left(IN_{2,4}^{LR} - IN_{8,8}^{HR}\right) = 48 - 40 = 8\text{''},$$

and $d_2$ may be, for example, characterized by $$\text{``}d_2 = \left(IN_{8,8}^{LR} - IN_{3,4}^{HR}\right) = 40 - 38 = 2\text{''},$$

but it is not limited thereto.

Next, in step S260, the processor 104 converts the target pixel into an output pixel based on the second resolution parameter combination $\text{PAR}_{HR}$.

Similarly, in an embodiment of the disclosure, the output pixel may be characterized by $$\text{``}OUT_{i,j}^{HR} = A_{i,j}^{HR} \cdot IN_{i,j}^{HR} + b_{i,j}^{HR}\text{''}.$$

In this embodiment, based on the implementation manner that the first resolution parameter combination $\text{PAR}_{LR}$ after the aforementioned combination is assigned as the second resolution parameter combination $\text{PAR}_{HR}$ of the target pixel, accordingly, $$\text{``}A_{x,y}^{LR} = A_{i,j}^{HR}\text{''} \text{ and } \text{``}b_{x,y}^{LR} = b_{i,j}^{HR}\text{''}.$$

In other words, the output pixel of this embodiment may be characterized by $$\text{``}OUT_{i,j}^{HR} = A_{x,y}^{HR} \cdot IN_{x,y}^{HR} + b_{x,y}^{LR}\text{''}.$$

In the embodiment of FIG. 6, the target pixel (e.g., the first pixel 611) in the first image $IN_{HR}$ may be characterized by $$IN_{8,8}^{HR},$$

so the corresponding output pixel may be characterized by $$\text{``OUT}_{8,8}^{HR} = A_{x,y}^{LR} \cdot IN_{8,8}^{HR} + b_{x,y}^{LR}\text{''}.$$

but the disclosure is not limited thereto. Furthermore, the processor 104 correspondingly combine each first pixel selected with the corresponding output pixel, so as to generate the output image $OUT_{HR}$ with a size of, for example, 10×10.

Figure 7:
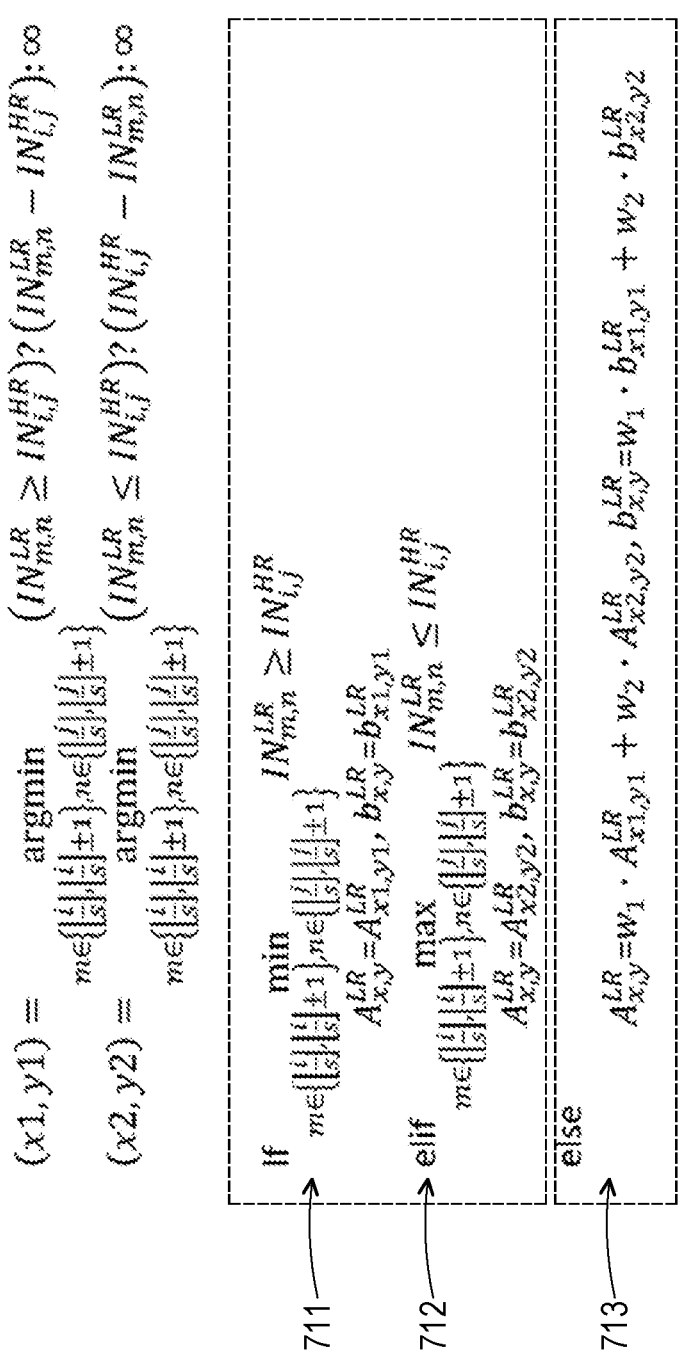
FIG. 7 is a mathematical representation according to the first to third embodiments of the disclosure.

Please refer to FIG. 7, which is a mathematical representation according to the first to third embodiments of the disclosure. In FIG. 7, (x1, y1) and (x2, y2) may be characterized by the mathematical formulas shown. In addition, operation 711 may be understood as the determination method of the second resolution parameter combination $PAR_{HR}$ corresponding to the first embodiment, operation 712 may be understood as the determination method of the second resolution parameter combination $PAR_{HR}$ corresponding to the second embodiment, and operation 713 may be understood as the determination method of the second resolution parameter combination $PAR_{HR}$ corresponding to the third embodiment. For related details, reference may be made to embodiments mentioned above, so details will not be repeated here.

In the embodiment of the disclosure, for each first pixel in the first image $IN_{HR}$, the processor 104 may convert the first pixel into the corresponding output pixel through implementation manners described in the first, second, or third embodiment. Afterward, the processor 104 may combine each first pixel with the corresponding output pixel to form the output image $OUT_{HR}$.

Figure 8A:
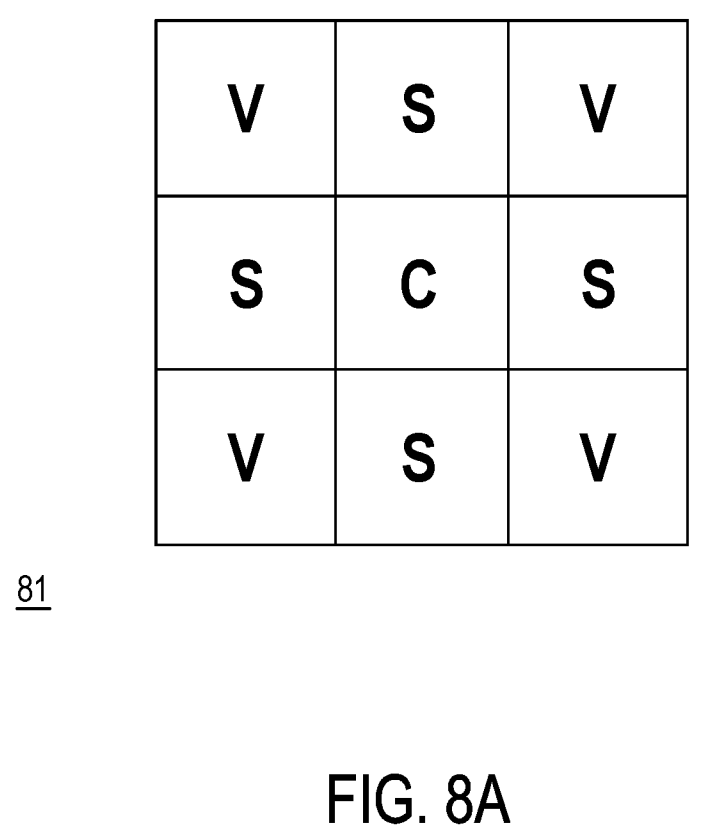

FIG. 8A is a schematic diagram of a first filter used for pre-smoothing according to an embodiment of the disclosure. Please refer to FIG. 8A. In a preferred embodiment, after obtaining the first resolution parameter combination $PAR_{LR}$ of each second pixel, the implementation manner further includes performing a pre-smoothing process on the first resolution parameter combination $PAR_{LR}$ by a first filter 81, in which the size of the first filter 81 is 3×3, and the first filter 81 has multiple weight values. The first filter 81 with the size of 3×3 has, for example, nine weight values. The weight value located at the center of the first filter 81 is a first weight value c. The weight values located at the four corners of the first filter 81 are the same, each being a second weight value v. The rest of the weight values are the same, each being a third weight value s.

Figure 8B:
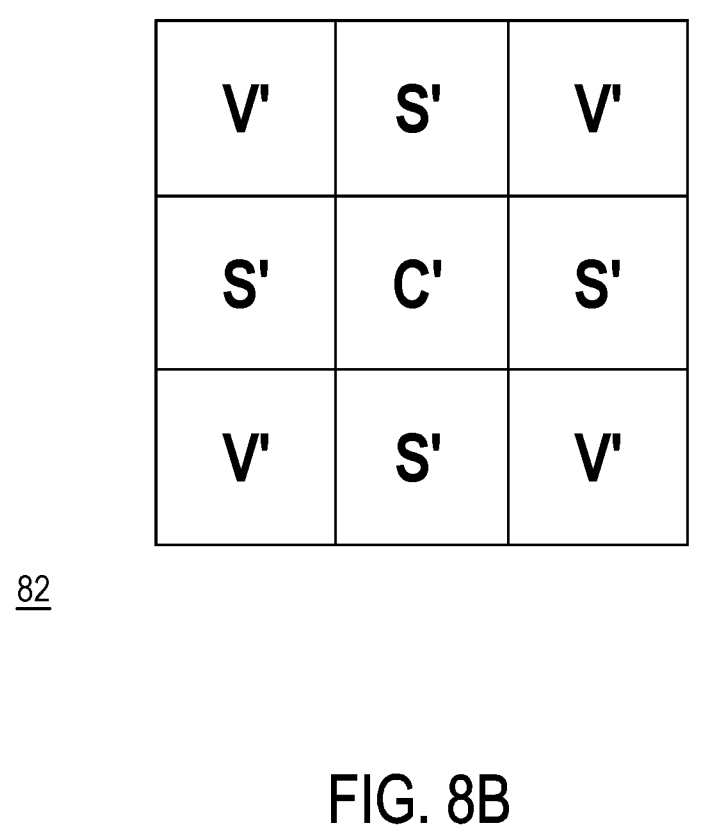

FIG. 8B is a schematic diagram of a second filter used for post-smoothing according to an embodiment of the disclosure. Please refer to FIG. 8B. In a preferred embodiment, after obtaining the second resolution parameter combination $PAR_{HR}$ of each target pixel, the implementation manner further includes performing a post-smoothing process on the second resolution parameter combination $PAR_{HR}$ by a second filter 82, in which the size of the second filter 82 is 3×3, and the second filter 82 has multiple weight values. At least one of the weight values of the first filter 81 is different from the weight values of the second filter 82. That is, the first filter 81 and the second filter 82 are different. The second filter 82 with the size of 3×3 has, for example, nine weight values. The weight value located at the center of the second filter 82 is a fourth weight value c'. The weight values located at the four corners of the second filter 82 are the same, each being a fifth weight value v'. The rest of the weight values are the same, each being a sixth weight value s'.

Since the method proposed by embodiments of the disclosure does not require the use of at least two neural networks, the computational complexity and cost are both low.

In summary, the image processing method and the image processing device proposed by embodiments of the disclosure can realize the guided filter with low computational complexity, low cost, and low difficulty.

Although the disclosure has been disclosed above in the embodiments, the embodiments are not intended to limit the disclosure. Persons with ordinary skill in the technical field may make some changes and modifications without departing from the spirit and scope of the disclosure. Therefore, the protection scope of the disclosure shall be determined by the appended claims.

What is claimed is:

1. An image processing method, applied by an image processing device, comprising:

obtaining a first image, and down-sampling the first image into a second image, wherein the first image comprises a plurality of first pixels, and the second image comprises a plurality of second pixels;

obtaining a first resolution parameter combination of each of the second pixels in the second image;

selecting a target pixel among the first pixels, and obtaining a plurality of second pixels corresponding to the target pixel among the second pixels accordingly;

determining a comparison result between the target pixel and each of the second pixels corresponding to the target pixel, and selecting at least one candidate pixel among the second pixels corresponding to the target pixel accordingly, comprising:

in response to determining that numerical values of the second pixels corresponding to the target pixel are all greater than a numerical value of the target pixel, selecting a second pixel with a smallest numerical value among the second pixels corresponding to the target pixel as the at least one candidate pixel;

in response to determining that the numerical values of the second pixels corresponding to the target pixel are all smaller than the numerical value of the target pixel, selecting a second pixel with a largest numerical value among the second pixels corresponding to the target pixel as the at least one candidate pixel; and in response to determining that the numerical values of the second pixels corresponding to the target pixel are not all smaller than the numerical value of the target pixel and are not all greater than the numerical value of the target pixel, selecting two second pixels among the second pixels corresponding to the target pixel as the at least one candidate pixel;

obtaining a second resolution parameter combination of the target pixel based on the first resolution parameter combination of each of the at least one candidate pixel; and converting the target pixel into an output pixel based on the second resolution parameter combination.

2. The method as claimed in claim 1, wherein obtaining the first resolution parameter combination of each of the second pixels in the second image comprises:

inputting the second image input into a neural network, wherein the neural network outputs the first resolution parameter combination of each of the second pixels in response to the second image.

3. The method as claimed in claim 1, wherein selecting the target pixel among the first pixels, and obtaining the plurality of second pixels corresponding to the target pixel among the second pixels comprises:

obtaining a specific pixel, among the second pixels, formed by down-sampling the target pixel; and obtaining a plurality of second pixels surrounding the specific pixel, and assigning the surrounding second pixels as a plurality of reference pixels corresponding to the target pixel.

4. The method as claimed in claim 1, wherein selecting the two second pixels among the second pixels corresponding to the target pixel as the at least one candidate pixel comprises:

dividing the second pixels corresponding to the target pixel into a first group and a second group, wherein numerical values of the second pixels in the first group is greater than the numerical value of the target pixel, and numerical values of the second pixels in the second group is smaller than the numerical value of the target pixel;

selecting a second pixel among the second pixels in the first group and the second group respectively as the at least one candidate pixel.

5. The method as claimed in claim 4, wherein the second pixel selected among the first group is a second pixel with a smallest numerical value in the first group, and the second pixel selected from the second group is a second pixel with a largest numerical value in the second group.

6. The method as claimed in claim 1, wherein obtaining the second resolution parameter combination of the target pixel based on the first resolution parameter combination of each of the at least one candidate pixel comprises:

assigning the first resolution parameter combination of the at least one candidate pixel as the second resolution parameter combination of the target pixel when the at least one candidate pixel among the second pixels corresponding to the target pixel is obtained and the at least one candidate pixel comprises a second pixel with a largest numerical value or a second pixel with a smallest numerical value among the second pixels.

7. The method as claimed in claim 1, wherein obtaining the second resolution parameter combination of the target pixel based on the first resolution parameter combination of each of the at least one candidate pixel comprises:

when the at least one candidate pixel obtained from the second pixels corresponding to the target pixel comprises a first candidate pixel and a second candidate pixel, combining a first resolution parameter combination of the first candidate pixel and a first resolution parameter combination of the second candidate pixel into the second resolution parameter combination of the target pixel, wherein a numerical value of the first candidate pixel is greater than a numerical value of the target pixel, and a numerical value of the second candidate pixel is smaller than the numerical value of the target pixel.

8. The method as claimed in claim 7, wherein the first resolution parameter combination of the first candidate pixel is characterized by $$\left(A_{x1,y1}^{LR}, b_{x1,y1}^{LR}\right),$$

the first resolution parameter combination of the second candidate pixel is characterized by $$\left(A_{x2,y2}^{LR}, b_{x2,y2}^{LR}\right),$$

and the second resolution parameter combination of the target pixel is characterized by $$\left(A_{x,y}^{LR}, b_{x,y}^{LR}\right),$$

wherein $$A_{x,y}^{LR} = w_1 \cdot A_{x1,y1}^{LR} + w_2 \cdot A_{x2,y2}^{LR}, \text{ and}$$
$$b_{x,y}^{LR} = w_1 \cdot b_{x1,y1}^{LR} + w_2 \cdot b_{x2,y2}^{LR}.$$

9. The method as claimed in claim 8, wherein $$w_1 = \frac{d_2}{d_1 + d_2}, w_2 = \frac{d_1}{d_1 + d_2},$$

$d_1$ is an absolute difference between the first candidate pixel and the target pixel, and $d_2$ is an absolute difference between the second candidate pixel and the target pixel.

10. The method as claimed in claim 1, wherein the target pixel is characterized by $$IN_{i,j}^{HR},$$

the second resolution parameter combination of the target pixel is characterized by $$\left(A_{i,j}^{HR}, b_{i,j}^{HR}\right),$$

and the output pixel corresponding to the target pixel is characterized by $$OUT_{i,j}^{HR},$$

wherein $$OUT_{i,j}^{HR} = A_{i,j}^{HR} \cdot IN_{i,j}^{HR} + b_{i,j}^{HR}.$$

11. The method as claimed in claim 1, wherein after obtaining the first resolution parameter combination of each of the second pixels, the method further comprises:

performing a pre-smoothing process on the first resolution parameter combination with a first filter, wherein after obtaining the second resolution parameter combination of the target pixel, the method further comprises:

performing a post-smoothing process on the second resolution parameter combination with a second filter, wherein the first filter is different from the second filter.

12. The method as claimed in claim 11, wherein the first filter and the second filter are with a size of 3×3, the first filter has a plurality of weight values, the second filter has a plurality of weight values, and at least one of the weight values of the first filter is different from the weight values of the second filter.

13. The method as claimed in claim 11, wherein the first filter with a size of 3×3 and the second filter with a size of 3×3 have nine weight values respectively;

wherein in the first filter, the weight value located at a center of the first filter is a first weight value; the weight values located at four corners of the first filter are same, each being a second weight value; rest of the weight values are same, each being a third weight value;

wherein in the second filter, the weight value located at a center of the second filter is a fourth weight value; the weight values located at four corners of the second filter are same, each being a fifth weight value; and rest of the weight values are the same, each being a sixth weight value.

14. An image processing device, comprising:

a non-transitory storage circuit, storing a program code; and a processor, coupled to the non-transitory storage circuit, accessing the program code to:

obtain a first image, and down-sample the first image into a second image, wherein the first image comprises a plurality of first pixels, and the second image comprises a plurality of second pixels;

obtain a first resolution parameter combination of each of the second pixels in the second image;

select a target pixel among the first pixels, and obtain a plurality of second pixels corresponding to the target pixel among the second pixels accordingly;

determine a comparison result between the target pixel and each of the second pixels corresponding to the target pixel, and select at least one candidate pixel among the second pixels corresponding to the target pixel accordingly;

obtain a second resolution parameter combination of the target pixel based on the first resolution parameter combination of each of the at least one candidate pixel; and convert the target pixel into an output pixel based on the second resolution parameter combination.

\* \* \* \* \*